United States Patent
Tanaka et al.

(10) Patent No.: US 8,949,205 B2
(45) Date of Patent: Feb. 3, 2015

(54) INFORMATION PROCESSING APPARATUS FOR PROCESSING APPLICATION SOFTWARE AND A PATCH FILE

(75) Inventors: Shinichi Tanaka, Kanagawa (JP); Daisuke Mori, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 374 days.

(21) Appl. No.: 12/823,597

(22) Filed: Jun. 25, 2010

(65) Prior Publication Data

US 2011/0055821 A1 Mar. 3, 2011

(30) Foreign Application Priority Data

Aug. 31, 2009 (JP) ................................. 2009-200683

(51) Int. Cl.
*G06F 17/30* (2006.01)
*G06F 9/445* (2006.01)

(52) U.S. Cl.
CPC ........................................ *G06F 8/65* (2013.01)
USPC ........................................ 707/695; 717/170

(58) Field of Classification Search
None
See application file for complete search history.

(56) References Cited

U.S. PATENT DOCUMENTS

| | | | |
|---|---|---|---|
| 6,216,175 B1 * | 4/2001 | Sliger et al. .................... | 717/169 |
| 6,493,871 B1 * | 12/2002 | McGuire et al. .............. | 717/173 |
| 7,685,591 B2 * | 3/2010 | Barr et al. ..................... | 717/169 |
| 2008/0141018 A1 | 6/2008 | Tanaka | |
| 2010/0095290 A1 * | 4/2010 | Miwa et al. .................... | 717/170 |
| 2010/0223602 A1 * | 9/2010 | Kreek et al. ................... | 717/140 |

FOREIGN PATENT DOCUMENTS

| | | |
|---|---|---|
| JP | 2008123139 A | 5/2008 |
| JP | 2009026086 A | 2/2009 |
| WO | WO 9208231 A1 * | 5/1992 |

OTHER PUBLICATIONS

Office Action for corresponding Japanese application JP-2009-200683, dated Jul. 5, 2011.

* cited by examiner

*Primary Examiner* — Hung Q Pham
(74) *Attorney, Agent, or Firm* — Matthew B. Dernier, Esq.; Gibson & Dernier LLP

(57) ABSTRACT

If a ROM medium is mounted on a media drive and a request for executing an application is received from an input device, a read controlling unit controls the media drive so that the media drive reads out a patch file from the ROM media and installs the patch file on a hard disk drive. After the patch file is installed, an execution processing unit applies the installed patch file and activates the game software.

6 Claims, 9 Drawing Sheets

ABCD.XYZ

FIG.8

INSTALLATION OF PATCH FILE

PATCH FILE IS SAVED ON ROM MEDIUM.
IN ORDER TO EXECUTE THE GAME,
IT IS REQUIRED TO INSTALL THE PATCH FILE.

DO YOU INSTALL THE PATCH FILE?

YES     NO

×BACK    ○CONFIRM

60

1
INFORMATION PROCESSING APPARATUS FOR PROCESSING APPLICATION SOFTWARE AND A PATCH FILE

BACKGROUND OF THE INVENTION

1. Field of the Invention

The present invention relates to information processing technology that is executed in information processing apparatuses such as game devices or the like.

2. Description of the Related Art

Background Technology

Game software is generally distributed and sold in the form of ROM media, such as, optical disks, magneto-optical disks, Blu-ray disks (Blu-ray is trademarked), or the like. Game software that is written on a ROM medium is not re-writable. Therefore, a patch file is applied in order to fix bugs included in part of the game software, modify functions, or add functions. The patent document 1 listed below discloses a game device that compares version information stored on a recording medium and version information included in a patch file, loads into memory a boot file to which newer version information is given, and executes the startup process of a game.

Patent document 1: US patent application: Publication No US2008/0141018.

The development of the Internet realizes an environment where patch files are distributed from a server to respective user terminals via the Internet. Traditionally, game software with which flaws are modified is also provided for users through the selling of ROMs that are re-mastered by incorporating patch files therein. On a re-mastered ROM, game software is saved in a form where patch files are applied thereon.

In case a user terminal acquires a patch file via the Internet and installs the patch file, since this patch file is to be stored in an auxiliary storage device, such as a hard disk drive or the like, path information for specifying a module is created in the patch file under the assumption that the patch file is stored in an auxiliary storage device. On the other hand, in the case of a re-mastered ROM medium, since all modules are saved on the ROM medium, path information is naturally created in accordance with the address of the ROM medium. Therefore, game software providers need to prepare different patch files for the case where patch files are provided via a server and for the case where patch files are provided by re-mastered ROM media. Further, in case a new patch file is provided through a server after re-mastering, a game software provider needs to undergo work of high maintenance by creating both of a patch file for the initial ROM media and a patch file for the re-mastered ROM media. Also, from a user's point of view, when installing a patch file via the Internet, a user downloads both of a patch file for the initial ROM media and a patch file for the re-mastered ROM media, and the user determines which patch file is to be used based on the ROM medium being used, which is not preferable with respect to both time and money.

Further, for example, trying to execute game software while using the initial ROM media after downloading a patch file for the re-mastered ROM medium may leads to a problem called the "skipping version" of patch files, whereby a patch file that is included in the re-mastered ROM medium does not exist in an auxiliary storage device.

SUMMARY OF THE INVENTION

In this background, a purpose of the present invention is to provide technology where patch files can be appropriately applied to application software.

According to one exemplary embodiment of the present invention, an information processing apparatus is provided. The information processing apparatus comprises: a drive device operative to read out data from a recording medium having recorded thereon application software and a patch file; a read controlling unit operative to control the drive device so that the drive device reads data; an execution processing unit operative to activate application software; and a storage device, wherein the read controlling unit, upon receiving a request for executing the application software, allows the drive device to read out a patch file from recording medium and installs the patch file on the storage device, and the execution processing unit, after installing the patch file, activates the application software while applying the patch file installed on the storage device.

Optional combinations of the aforementioned constituting elements and implementations of the invention in the form of methods, apparatuses, systems, recording media and computer programs may also be practiced as additional modes of the present invention.

BRIEF DESCRIPTION OF THE DRAWINGS

FIG. 8 shows a confirmation screen for confirming the installation of a patch file saved on a ROM medium.

DETAILED DESCRIPTION OF THE INVENTION

The invention will now be described by reference to the preferred exemplary embodiments. This does not intend to limit the scope of the present invention, but to exemplify the invention.

First, an explanation on the general outline of exemplary embodiments of the present invention will be given before a concrete explanation thereof is given. An information processing apparatus according to a present exemplary embodiment executes application software saved on a re-mastered recording medium. On the recording medium, not only the application software but also a patch file to be applied to the application software is saved. The application software is not saved in the form where the patch file has been applied, but the application software and the patch file are saved separately and independently. In this point, the manner of saving of the present embodiment differs from the conventional manner of saving for the re-mastered recording media.

If a request for executing the application software is input by a user, the information processing apparatus, before activating the application software, reads a patch file from the recording medium and installs the patch file on a storage device, such as a hard disk drive or the like. After this, the information processing apparatus activates the application software while applying the installed patch file. Since a patch file to be saved on a recording medium can be the same patch file as a patch file that is provided from a server, the work load of the game software providers who create patch files is reduced. There is also an advantage for the user terminals, that is, the possibility of the occurrence of the "skipping version" of patch files can be reduced or eliminated.

Figure 1:
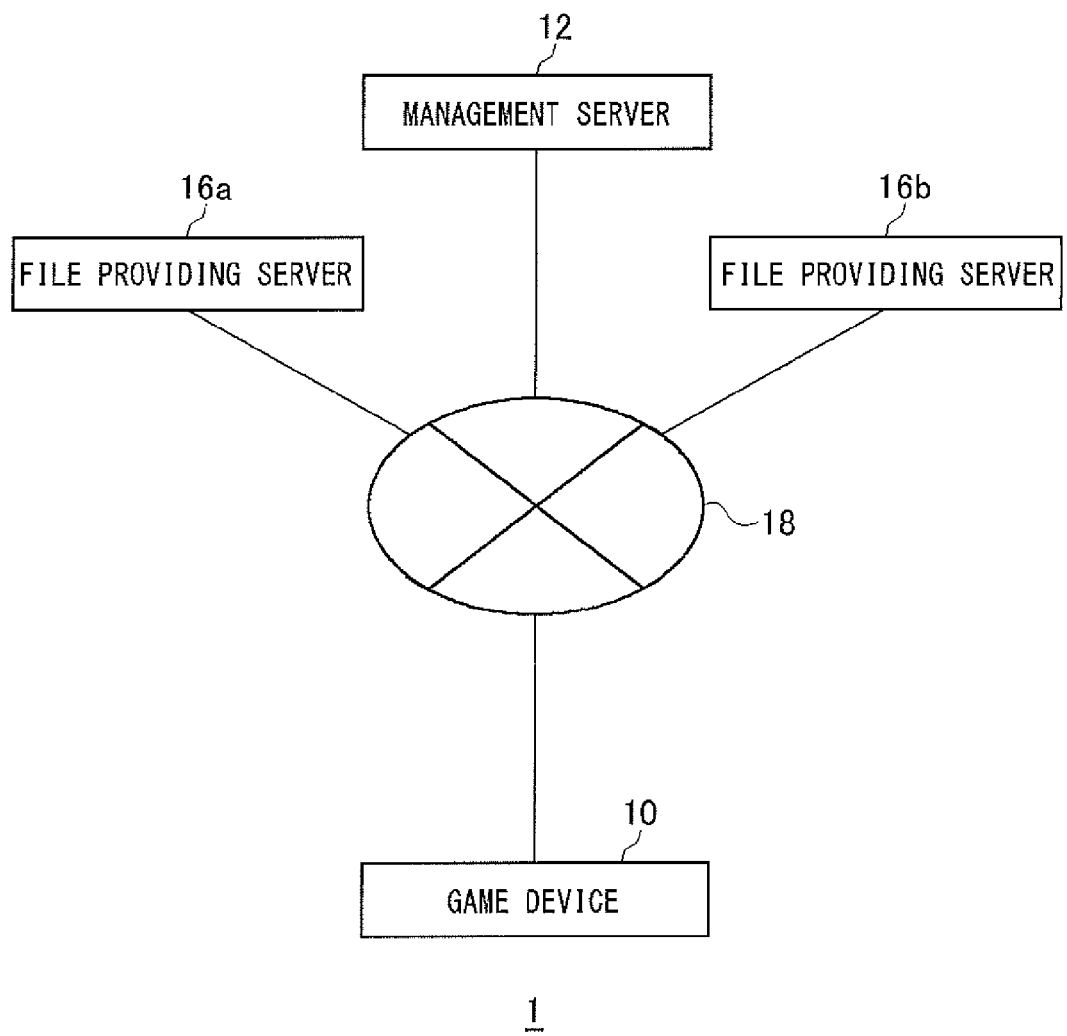
FIG. 1 shows a file distribution system according to a present exemplary embodiment.

FIG. 1 shows a file distribution system 1 according to the present exemplary embodiment. The file distribution system 1 is constructed in a game system that provides an appropriate environment for executing game software. The file distribution system 1 supports the process for acquiring patch files to be applied to the game software.

The file distribution system 1 comprises: a game device 10, which is a user terminal; a management server 12, which manages the versions of patch files to be applied to game software; and file providing servers 16a and 16b (herein after collectively referred to as a "file providing server 16"), which provide patch files. The game device 10, management server 12, and the file providing servers 16 are communicably connected with each other via a network 18 such as the Internet or the like.

The management server 12 is managed by an administrator of a game system and retains version files. A version file includes patch information, which associates the version information of a patch file with the address information indicating the location where the patch file is to be stored. In case a plurality of patch files have been created for one piece of game software, the version file includes respective patch information for the respective patch files.

The management server 12 stores a version file on an address that is created by using, for example, the identification information (hereinafter referred to as a "title ID") of game software as the name of a directory and/or as the name of a file. The method for creating an address while using the title ID of game software as the name of a directory and/or a file is commonly used both in the management server 12 and the game device 10. Therefore, by creating an address while using the title ID of the game software to be started and by accessing the management server 12, the version file of the game software can be acquired.

The file providing server 16 is managed by a game software provider (e.g., a game manufacturer) and retains patch files to be applied to the game software. Patch files are used in order to fix the bugs of programs on ROM media, to modify or add functions, or the like. Patch files, according to the present exemplary embodiment, are created in a format that includes a differential program, which is a difference from an older version of a patch file, or the like. When the patch file is installed in the storage device of the game device 10, the patch file is retained in the form of a differential file that is integrated with the patch file of an older version. Therefore, by applying the differential file to the game software, the game software on which all the versions of patch files are applied is executed.

A game manufacturer creates a patch file for game software and then stores the patch file in the file providing server 16 so that the game device 10 can download the patch file from the file providing server 16. The game manufacturer sets the status of the created patch file to be downloadable and notifies the game system administrator of patch information, which includes the title ID, version information of the patch file, address information indicating a location wherein the patch file is to be stored, or the like. This notification may be provided either online or offline. The administrator of the system receives the patch information and then adds the content of patch information to the version file and updates the version file, accordingly.

In the file distribution system 1 according to the present exemplary embodiment, upon activating the power in the game device 10, an operating system (hereinafter, merely referred to as "OS") is activated, and the environment for executing game software is arranged. A recording medium having recorded thereon game software is mounted on the drive device of the game device 10, a request for executing the game is input by a user, and then the OS first searches whether a patch file is saved on the recording medium. In case a patch file is saved, the drive device reads out the patch file into an auxiliary storage device and installs the patch file, accordingly. Upon completing the installation of the patch file, the drive device reads out the boot file of the patch file retained in the auxiliary storage medium, and the game device 10 executes the boot file and applies the patch to the game software.

The game device 10 activates the game software and then, executes the startup process, in parallel with accessing the management server 12 via the network 18 and acquiring the version file of the started game software. The game device 10 determines whether the version file includes version information that is newer than that of the installed patch file. In case the version file includes version information of a patch file that is not retained, the game device 10 accesses the file providing server 16, downloads the patch file that is not retained, and reboots the game software. This allows the game device 10 to execute the latest game application.

The technique indicated in the present exemplary embodiment is implemented not only in the game device 10 but also in information processing apparatuses in which ROM media is to be fit, the ROM media saving a program, such as accountancy software, CAD software, or the like.

Figure 2:
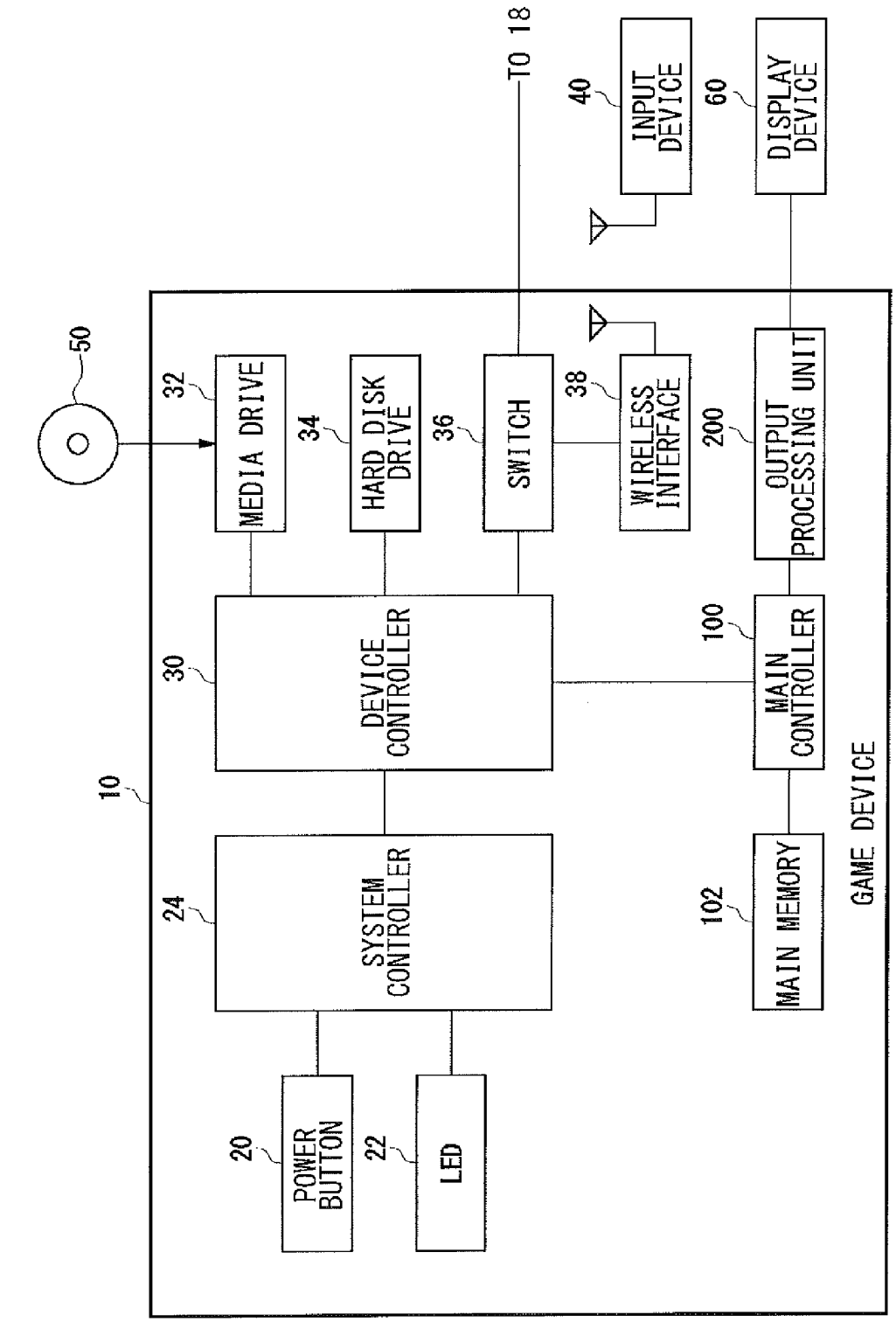
FIG. 2 shows a functional block diagram of a game device.

FIG. 2 shows a functional block diagram of the game device 10. The game device 10 is provided with a power button 20, an LED 22, a system controller 24, a device controller 30, a media drive 32, a hard disk drive 34, a switch 36, a wireless interface 38, a main controller 100, a main memory 102, and an output processing unit 200.

The power button 20 is an input unit where a control that is input by the user is provided. The button is operated to turn the power of the game device 10 on or off. The LED 22 is turned on or off to indicate whether the power has been turned on or off. The system controller 24 detects the pushed state or the non-pushed state of the power button 20. Upon detecting the transition from the power-off state to the pushed state, the system controller 24 activates the main controller 100 and turns the LED 22 on. When a power cable is connected to the game device 10, the system controller 24 maintains a standby mode even in the power-off state and monitors whether the power button 20 is pushed.

Like a south bridge, the device controller 30 is configured as an LSI (large-scale integrated circuit) for executing the delivery of information between devices. As illustrated, devices, such as the system controller 24, the media drive 32, the hard disk drive 34, the switch 36, the main controller 100, or the like, are connected to the device controller 30. The device controller 30 controls the timing of the data transfer by canceling the differences in the electrical property of the devices or the differences in data transfer rates thereof.

The media drive 32 is a drive device that mounts and drives a ROM medium 50 that saves game software and patch files and that is fit to the drive, and reads out necessary game software and a patch file from the ROM medium 50. The ROM medium 50 is a read-only recording medium, such as an optical disk, a magnet optical disk, a Blu-ray disk, or the like.

Game software includes a main program that executes a game application, a boot file for activating the main program, game data, such as game characters, scenarios, or the like, the title ID of the game software, the version information of the game software, or the like.

The main program is a program that is needed for the execution of applications. By running the main program, a game application proceeds. The boot file is a program for activating the main program. By executing the boot file, the main program is invoked and executed.

A patch file includes a boot file for activating the main program, a modification program for modifying the main program of game software, added game data, the title ID of the game software, the version information of the patch file, or the like. On the ROM medium 50, the patch file is stored in a format unlike a patch file applied to the game software but a format stored separately from the game software.

The version information of game software and the version information of patch files can be any information to the extent that the respective order of creation can be specified with the information. For example, the version information of the game software may be set as "1", the version information of a patch file that is first created may be set as "2", and the version information of a patch file that is subsequently created may be set as "3". That is, the version information of a newly-created patch file may be given a number that is bigger than the version information of the patch files and the game software that was created before. Alternatively, information that simply specifies the year, month, and day when the game software is created or the year, month, and day when the patch file is created may be given as version information.

The hard disk drive 34 is an auxiliary storage device that drives a built-in hard disk and reads/writes data while using a magnetic head. The switch 36 is an Ethernet switch (Ethernet is trademarked) and is a device connected, either by a wired or wireless connection, with external devices and transmits and receives information. According to the present exemplary embodiment, a cable is plugged into the switch 36 so as to be connected communicably with the network 18. Further, the switch 36 is connected with the wireless interface 38. The wireless interface 38 is connected with the input device 40, which has a wireless communication function, by using a communication protocol such as the Bluetooth (registered trademark) protocol, the IEEE 802.11 protocol, or the like. An input device 40 is a means for allowing a user to input an operation therein.

The main controller 100 comprises a multi-core CPU, wherein one CPU is provided with one general-purpose processor core and a plurality of simple processor cores. The general-purpose processor core is referred to as a PPU (Power Processing Unit), and the rest of the processor cores are referred to as an SPU (Synergistic-Processing Unit).

The main controller 100 comprises a memory controller connected to the main memory 102. The PPU is provided with a register and comprises a main processor as the main body for executing calculations. The PPU efficiently allocates a task to respective SPUs as a basic unit of processing in respective applications. The PPU may execute a task by itself. The SPU is provided with a register and comprises a sub processor as the main body for executing calculations and a local memory (dedicated RAM) as local storage. The SPU is provided with a DMA (Direct Memory Access) controller as a controlling unit for its exclusive use. By transmitting data between the main memory 102 and the local memory, the SPU can process stream data at a high speed and can implement high-speed data transmission between the local memory and the frame memory built in the output processing unit 200.

The output processing unit 200 is connected to the display device 60 and outputs image signals and sound signals, which are the results of processing the application. The output processing unit 200 comprises a GPU (Graphics Processing Unit), which implements an image processing function. The GPU adopts an HDMI (High Definition Multimedia Interface) and is able to digitally output image signals.

Figure 3:
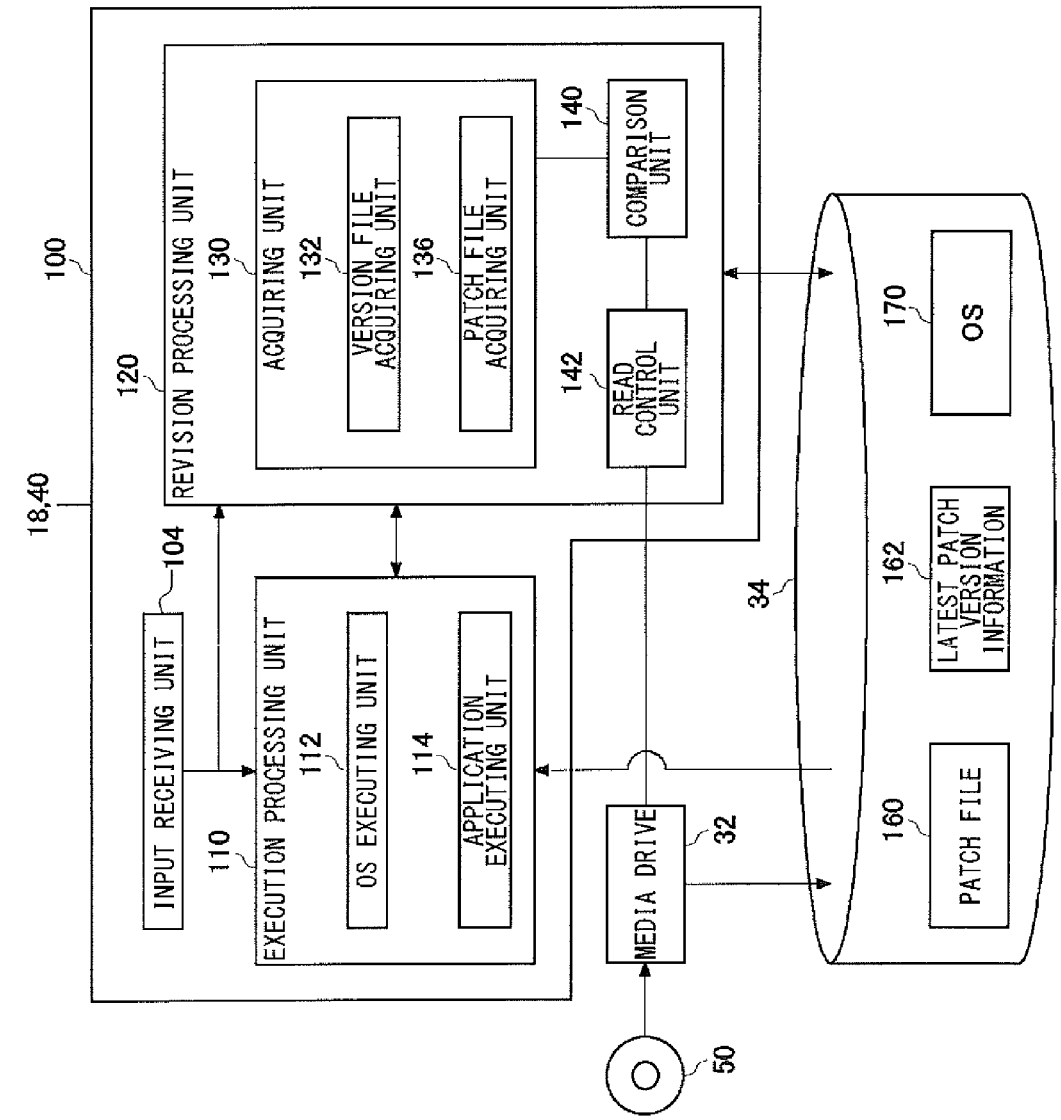
FIG. 3 shows a functional block for executing a process of acquiring patch files in the game device.

FIG. 3 shows a functional block for executing the process of acquiring patch files in the game device 10. In FIG. 3, structures such as a device controller 30, a main memory 102, or the like are omitted. The main controller 100 comprises an input receiving unit 104, an execution processing unit 110, and a revision processing unit 120. The execution processing unit 110 is provided with an OS executing unit 112, which executes the OS, and an application executing unit 114, which executes 3 game application. The revision processing unit 120 comprises an acquiring unit 130, a comparison unit 140, and a read control unit 142. The acquiring unit 130 is provided with a version file acquiring unit 132 and a patch file acquiring unit 136. Although in FIG. 3, structures relating to patch file acquisition processing for respective functions are indicated separately, for example, the read control unit 142 is one of the functions of system software executed by the OS executing unit 112.

The elements depicted in FIG. 3, as functional blocks for performing various processes, are implemented in hardware by CPUs (Central Processing Units), memory, or other LSI's, and in software by programs, etc., loaded into memory. As mentioned before, the main controller 100 is provided with a single PPU and a plurality of SPUs. The PPU and the SPUs can form functional blocks either alone or in combination. Therefore, it will be obvious to those skilled in the art that the functional blocks may be implemented in a variety of manners by hardware only, software only, or a combination of both.

Upon power up, the OS executing unit 112 activates the OS 170 stored in the hard disk drive 34. The ROM medium 50 is mounted on the media drive 32, and then the media drive 32 drives the ROM medium 50. The OS executing unit 112 executes the recognition process of the ROM medium 50, and, upon determining that the ROM medium 50 is an authentic medium, the OS executing unit 112 displays an icon of the game software on a menu screen.

Figure 4:
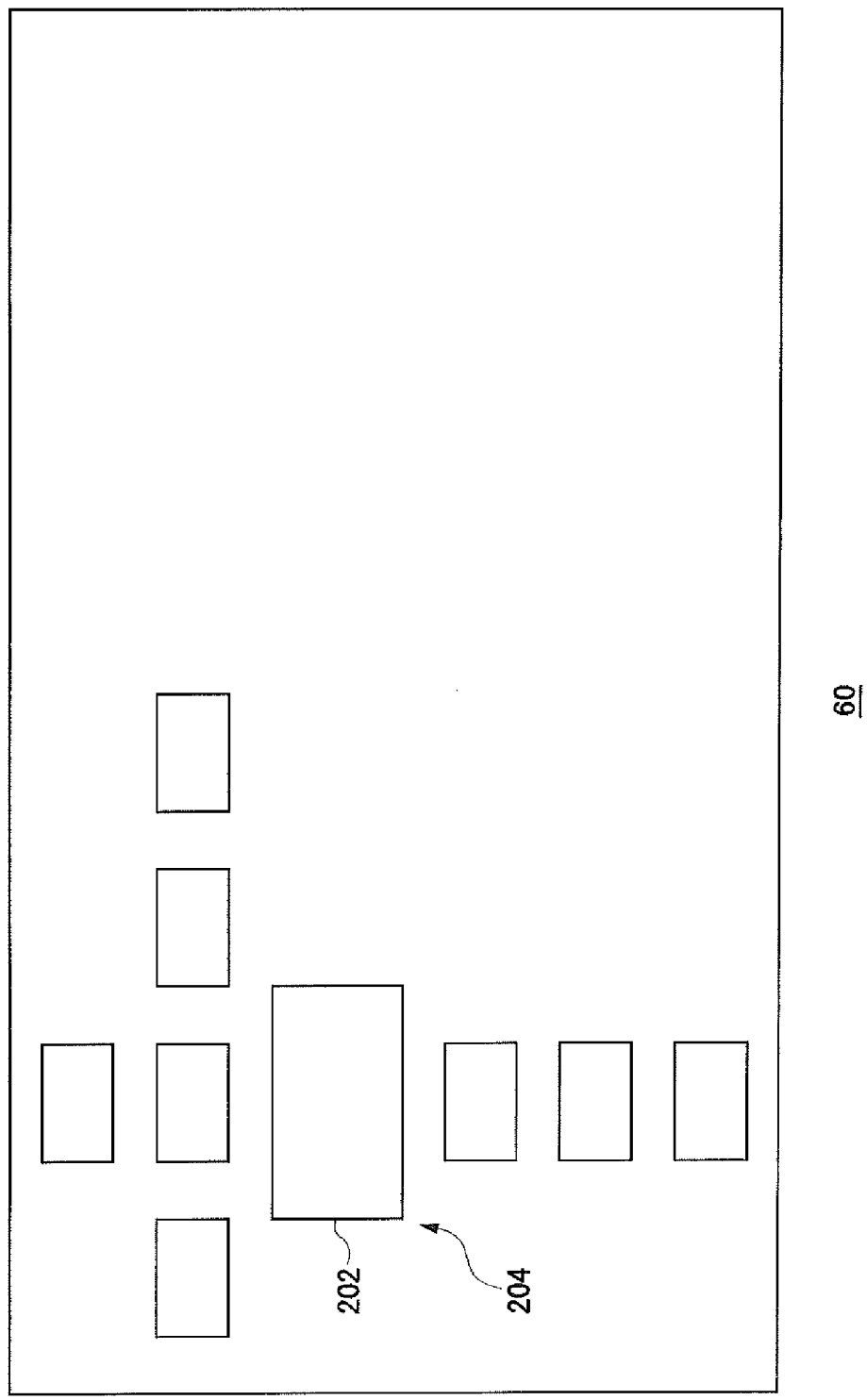
FIG. 4 shows a menu screen displayed on a display device.

FIG. 4 shows the menu screen displayed on the display device 60. An icon 202 is an image that identifies game software saved on the ROM medium 50. In the case where the icon 202 enters a selection region 204, the icon 202 is displayed in a larger size as shown in FIG. 4. While the icon 202 is placed in the selection region 204, if a user manipulates a predetermined button of the input device 40, the input receiving unit 104 receives the input as a request for executing the game and provides the read control unit 142 with the request.

Then, the read control unit 142 controls the media drive 32 so that the media drive 32 searches through the ROM medium 50 and checks whether the ROM medium 50 contains a patch file. If a patch file is present, the media drive 32 reads the version information of the patch file and provides the comparison unit 140 with the information. Alternatively, read-out version information may be provided to the comparison unit 140 via the hard disk drive 34. An explanation will be given below of a case where there exists read-out version information for "2" and "3".

The comparison unit 140 compares the version information of the patch file read-out from the ROM medium 50 and the version information of the patch file already retained in the hard disk drive 34. If no patch file is retained in the hard disk drive 39, the comparison unit 140 determines that the patch file that is saved in the ROM medium 50 is not retained in the hard disk drive 34 and notifies the read control unit 192 thereof. The comparison unit 140 may convey that no patch file, of which the version information is "2" or "3", is retained in the hard disk drive 34. Alternatively, the comparison unit 140 may convey that no patch file exists in the hard disk drive 34. Upon receiving the results of comparison performed by the comparison unit 140, the read control unit 142 controls the media drive 32 and allows the media drive 32 to read out a patch file that is not retained in the hard disk drive 34 from the ROM medium 50 into the hard disk drive 34 and to install the patch file. In case a plurality of patch files are to be read out, the patch files are installed on the hard disk drive 34 in the order from oldest to newest, according to its version information for specifying the patch file. As described before in the present exemplary embodiment, patch files are created as differential files. First, a patch file of an older version is installed, and then a patch file of the next version is installed as an addition to the patch file of the older version. In this manner, a differential file for game software is created, by which, the differential file for the game software can be properly installed.

In case a patch file of which the version information is "2" has been already installed on the hard disk drive 34, the comparison unit 140 determines that the hard disk drive 34 does not retain a patch file of which the version information is "3" and notifies the read control unit 142 thereof. In this case, the read control unit 142 allows the media drive 32 to read out only the patch file of which the version information is "3" into the hard disk drive 34 and installs the patch file, accordingly.

In this manner, the read control unit 142, upon receiving the results of the comparison by the comparison unit 190, does not read a patch file that has been already installed on the hard disk drive 34 and only reads a patch file that has not been installed. This allows for the reduction of time needed for installing. The latest version information of patch files included in the version information of patch files installed on the hard disk drive 34 is managed as the latest patch version information 162. The latest patch version information 162 is managed by the revision processing unit 120, and every time the patch file 160 is installed, the latest parch version information 162 is revised. In this example, the latest patch version information 162 is set to "3".

The process of installing a patch file by the read control unit 142 is completed, and the OS executing unit 112 executes the boot file of the game, accordingly. In this process, if the patch file 160 has been installed on the hard disk drive 34, the OS executing unit 112 executes the boot file included in the patch file. If the patch file 160 has not been installed on the hard disk drive 34, the OS executing unit 112 executes the boot file included in the ROM medium 50, accordingly. After the boot file executed, the application executing unit 114 loads the main program saved on the ROM medium 50 and the installed patch file into the main memory 102 and activates the game software.

In this example, the version of the game software saved on the ROM medium 50 is assumed to be "1", and the title ID is assumed to be "ABCD". The application executing unit 114 searches through the hard disk drive 34 and checks whether a patch file 160 has been installed on the hard disk drive 34. If the patch file 160 has been already installed, the application executing unit 119 applies the patch file 160 and activates the game software. In the case where the boot file utilized for the activation of game application is the boot file read out from the hard disk drive 34, the application executing unit 119 may determine, without executing the search process, that the patch file 160 exists. In this example, the patch files of which the version file is "2" or "3" have been installed. Therefore, the application executing unit 114 applies patches and executes the game application.

The game software is activated while applying the patch files, and then the version file acquiring unit 132 creates an address for acquiring the version file for the game software in accordance with a predetermined method for creating an address. The address of the game software having the title ID "ABCE" is set according to the method for creating address as listed below.

http://www.***.com/ABCD/ABCD.XYZ

"www.***.com" identifies the management server 12 and "ABCD/ABCD.XYZ" identifies the name of the file (ABCD.XYZ) that is included in a directory (ABCD) of the management server 12. That is, with this method for creating addresses, the title ID of game software is utilized as the directory name and the file name. Therefore, by allowing the manager of the management server 12 to store version files while setting respective title IDs as directory names and setting respective title IDs as file names for respective game software, the game device 10 can acquire a version file for the game software to be activated.

The version file acquiring unit 132 accesses the management server 12 via the network 18 based on the created address and downloads and acquires the version file of game software.

Figure 5:
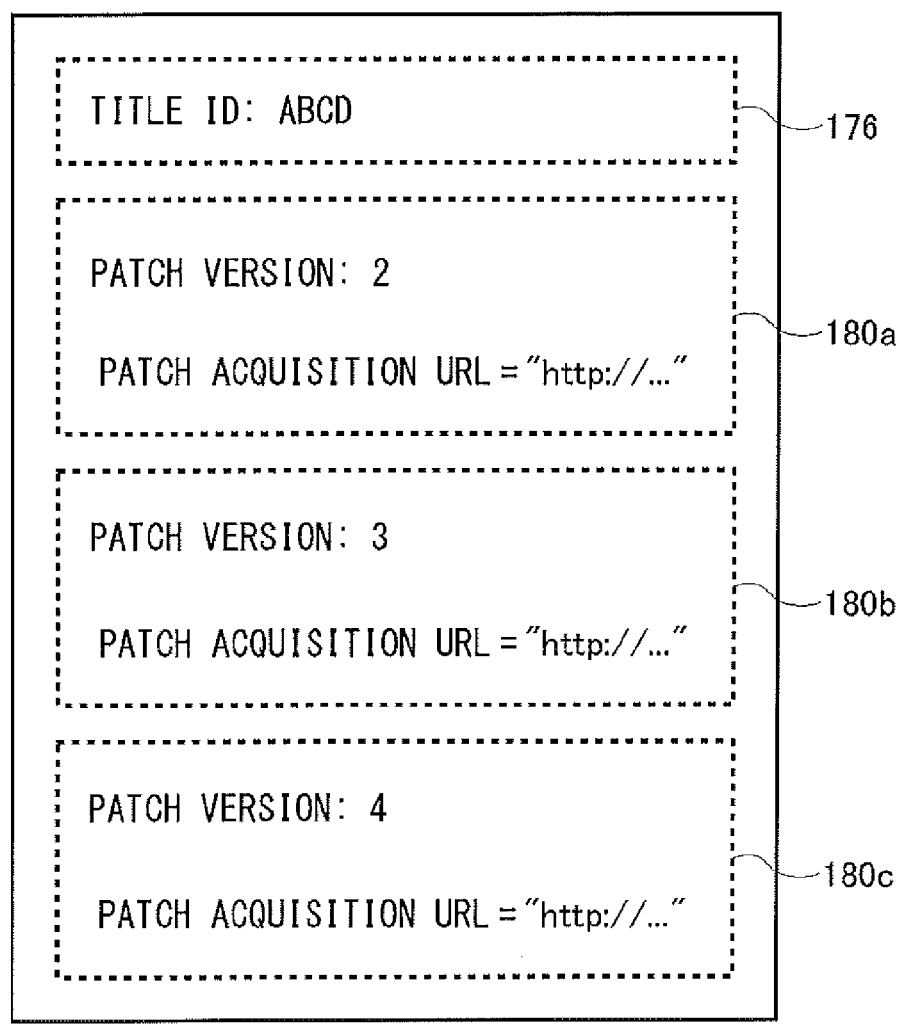
FIG. 5 shows an example of a version file.

FIG. 5 shows an example of a Version file. Although FIG. 5 shows information included in a version file in a simplified manner, a version file may be described in XML format. The file name of the version file is "ABCD.XYZ". The version file includes title information 176 and patch information 180a, 180b, and 180c.

The title information 176 is information for identifying a title ID. In this example, the title ID is "ABCD". The patch information 180 is information where the version information of a patch file of the game software and the address information indicating the location where the patch file is to be stored are associated with each other. In FIG. 5, the version information of a patch file is shown as "patch version" and the address information as "patch acquisition URL", respectively. The game device 10 can acquire a patch file by connecting to the patch acquisition URL.

The patch information 180a, 180b, and 180c is information related to each patch file. This example indicates that three patch files exist for the game software having title ID "ABCD". The patch information 180a, 180b, and 180c are described in the order of date of creation from oldest to newest, from top to bottom. The patch information 180a indicates the address information of the patch file of which the version information is "2". The patch information 180b indicates the address information of the patch file of which the version information is "3". The patch information 180c indicates the address information of the patch file of which the version information is "4".

The version file acquiring unit 132 acquires the version file of game software, and the comparison unit 140 compares the version information of the patch file that is applied to the game software and the version information included in the version file, accordingly. The application executing unit 114 uses the patch files of version 2 and 3 and applies the patches to the game software. The comparison unit 140 may compare the version information included in the latest patch version information 162 and the version information included in the version file. The comparison unit 190 compares the latest version information "3" of the patch file 160, which is applied to the game software being executed, and the version information "2", "3", and "4" included in the version file and determines that the version information "4" included in the version file is newer than the version information of the patch file that is applied to the game software being executed. This comparison result is provided to the patch file acquiring unit 136.

Upon receiving the comparison result, the patch file acquiring unit 136 accesses the file providing server 16 and acquires the patch file that is identified by the version information "4". The acquisition address of a patch file of version 4 is described in the patch information 180c as "patch acquisition URL". The patch file acquiring unit 136 accesses this address, acquires the patch file of version 4, and installs the patch file on the hard disk drive 34. The patch file acquiring unit 136 adds the acquired patch file of version 4 to the patch file 160 that has been installed on the hard disk drive 34 and revises the patch file 160. Upon acquiring a new patch file, the execution processing unit 110 reboots the game software, applies the revised patch file 160, and executes the game software.

An explanation on the process of acquiring a patch file according to the present exemplary embodiment will be given in comparison with the process of acquiring a patch file from the file providing server 16 by using a re-mastered, conventional-type ROM medium. With re-mastered, conventional-type ROM medium, game software on which a patch has been already applied is saved. First, an explanation on the conventional process for acquiring a patch file will be given while assuming "3" as the version of game software on which patches of version 2 and 3 are applied.

Figure 6A:
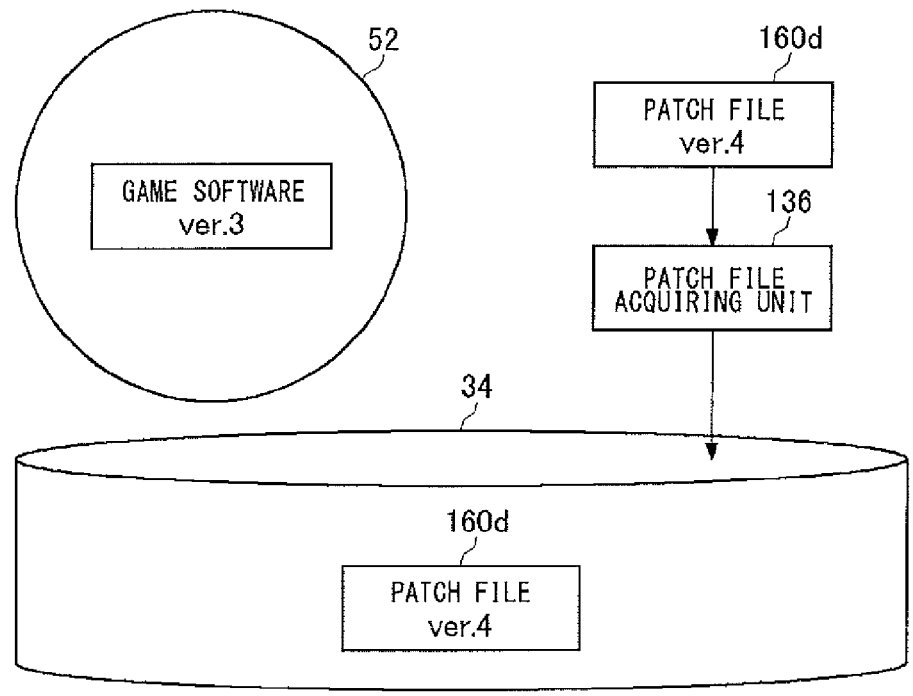
FIG. 6A indicates a status of installation in case a patch file is acquired while using the conventional-type, re-mastered ROM medium, and FIG. 6B indicates status of installation in case a patch file is acquired while using a ROM medium according to a present exemplary embodiment.

FIG. 6A indicates the status of installation in case a patch file is acquired while using the re-mastered, conventional-type ROM medium 52. The game software of version 3 is game software of version 1 on which patch files of version 2 and 3 are applied. After the application executing unit 114 activates the game software, the version file acquiring unit 132 acquires the version file of the game software. The comparison unit 190 compares the version information of the game software and the version information included in the version file (see FIG. 5). Upon receiving the comparison results, the patch file acquiring unit 136 accesses the file providing server 16 and acquires a patch file 160d that is identified with version information "4".

Figure 6B:
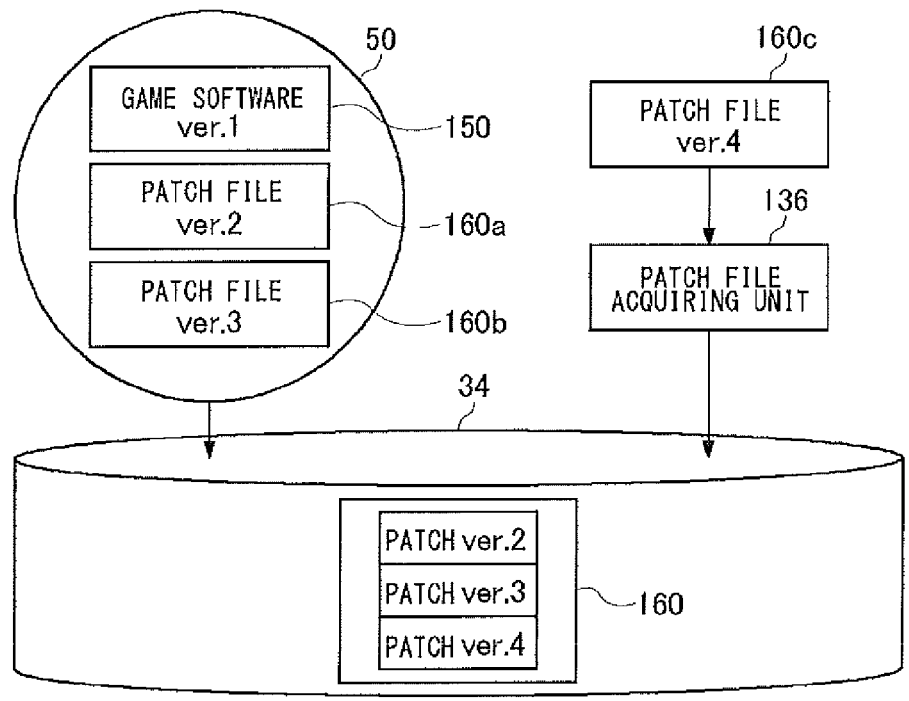

FIG. 6B indicates the status of installation in case a patch file is acquired while using the ROM medium 50 according to the present exemplary embodiment. The patch file 160a of version 2 and the patch file 160b of version 3 are installed from the ROM medium 50 onto the hard disk drive 34, and a patch file, which is the fusion of the patch file 160a and the patch file 160b, is created. The application executing unit 114 activates the game software 150 while applying the patch file. After that, the version file acquiring unit 132 acquires the version file of the game software 150, and then the comparison unit 140 compares the version information of the patch file that is applied to the game software 150 and the version information included in the version file. Upon receiving the comparison results, the patch file acquiring unit 136 accesses the file providing server 16 and acquires a patch file 160c identified by version information "4". The patch file acquiring unit 136 creates a patch file 160, which is a fusion of the patch file that has been installed on the hard disk drive 34 and the acquired patch file 160c.

On the hard disk drive 34 shown in FIG. 6A, only the patch file 160d of version 4 is installed, and the patch files 160a and 160b of version 2 and version 3, respectively, are not installed. Therefore, as far as the ROM medium 52 is used, the game application is executed properly. However, if a ROM medium that is not re-mastered is used, the game application can not be properly executed since the patches of version 2 and 3 can not be applied. A ROM medium that is not re-mastered is a ROM medium that saves the game software 150 of version 1 and saves no patch files.

On the other hand, on the hard disk drive 34 shown in FIG. 6B, the patch file 160, onto which all the patch files from the oldest patch file 160a of version 2 to the newest patch file 160c are built, is installed. Therefore, there is an advantage that, even if a ROM medium that is not re-mastered is used, all the patches can be applied and the game application can be executed properly.

The patch file 160d shown in FIG. 6A is created differently from the patch file 160c shown in FIG. 6B because of the differences of path information or the like. In order to enable the use of the patch file 160 commonly between a re-mastered ROM medium and an initial, non-re-mastered ROM medium, a recording medium is re-mastered while saving the game software and patch files separately on the ROM medium 50, as shown in FIG. 6B, which has the advantage of reducing the load on software providers for creating patch files.

Figure 7:
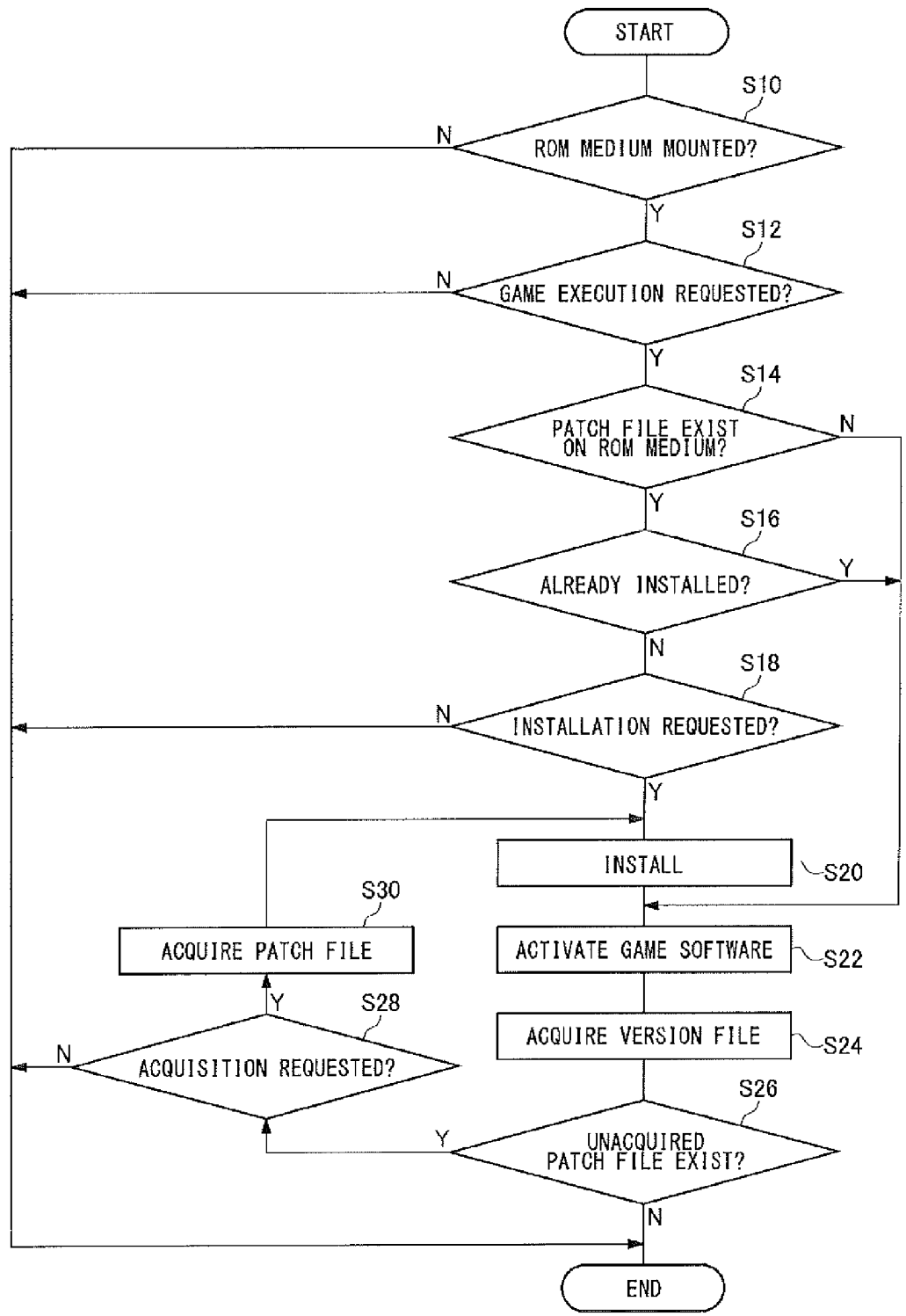
FIG. 7 is a flowchart showing a process for acquiring a patch file in the game device.

FIG. 7 shows a flowchart of a process for acquiring a patch file in the game device 10. If the ROM medium 50 is not mounted on the media drive 32 (N in S10), the process of acquiring patch files and the process of activating game software are not executed. If the ROM medium 50 is mounted on the media drive 32 (Y in S10), the process of authenticating the ROM medium 50 is executed. If the ROM medium 50 is determined to be an authentic medium, a menu screen shown in FIG. 4 is displayed on the display device 60. If a user does not manipulate the input device 40 and does not input the request for executing the game (N in S12), the game software is not activated. If a user inputs a request for executing the game (Y in S12), the read control unit 142 controls the media drive 32 and allows the media drive 32 to check whether a patch file is saved on the ROM medium 50 (S14). If no patch file is saved (N in S14), the OS executing unit 112 reads out a boot file from the ROM medium 50 into the main memory 102 and executes the boot file. Then, the application executing unit 114 executes the main program and activates the game software (S22). In this step, if a patch file 160 has been installed on the hard disk drive 34, the OS executing unit 112 reads out the boot file from the hard disk drive 34 to the main memory 102 and executes the boot file, and the application executing unit 114 applies the patch file 160 and activates the game software.

On the other hand, if a patch file is saved on the ROM medium 50 (Y in S14), the comparison unit 140 acquires the version information of a patch file that is read out from the media drive 32. The comparison unit 190 uses the version information and determines whether a patch file of the same version as the patch file saved on the ROM medium 50 has already been installed on the hard disk drive 34 (S16). If the patch file has been already installed (Y in S16), the read control unit 142 disables the media drive 32 from reading the patch file of the same version. The OS executing unit 112 reads out the boot file from the hard disk drive 39 to the main memory 102 and executes the boot file. The application executing unit 114 applies the patch file 160 that has been already installed and activates the game software (S22).

On the other hand, if no patch file has been installed on the hard disk drive 34 (N in S16) that is of the same version as that of the patch file saved on the ROM medium 50, the OS executing unit 112 displays a confirmation screen on the display device 60 for the user to confirm whether to install the patch file.

FIG. 8 shows the confirmation screen for confirming the installation of patch file saved on the ROM medium 50. In this example, the patch file is saved on the ROM medium 50, and this confirmation screen notifies a user that the game can not be executed without installing the patch file. If the user selects "Yes", the input receiving unit 104 receives the selection operation as a request for installing (Y in S18), and the read control unit 142 controls the media drive 32 so that the media drive 32 reads a patch file from the ROM medium 50 and installs the patch file onto the hard disk drive 34 (S20). On the other hand, if the user selects "No" on the confirmation screen, the input receiving unit 109 receives the selection operation (N in S18), and the present flow chart ends. In this manner, in the game device 10 according to the present exemplary embodiment, the execution of the game application is disabled unless a patch file saved on the ROM medium 50 is installed. Conversely, since the game software is not activated without applying a patch if a re-mastered ROM medium 50 is used, an incentive can be given to users to install the patch file.

After the patch file is installed, the OS executing unit 112 reads out a boot file from the hard disk drive 34 into the main memory 102 and executes the boot file, and the application executing unit 114 applies the patch file 160 that has been installed and activates the game software (S22).

After the game software is started, the version file acquiring unit 132 uses the identification information of the started game software and acquires a version file via the network 18 (S24). The comparison unit 140 compares the version information of the patch file applied to the started game software and the version information included in the version file and determines whether a patch file that has not been acquired exists (S26). In case the version file includes version information that is newer than the version information of the patch file that is applied to the game software (Y in S26), the application executing unit 114 displays a confirmation screen on the display device 60 for the user to confirm whether to install the patch file.

Figure 9:
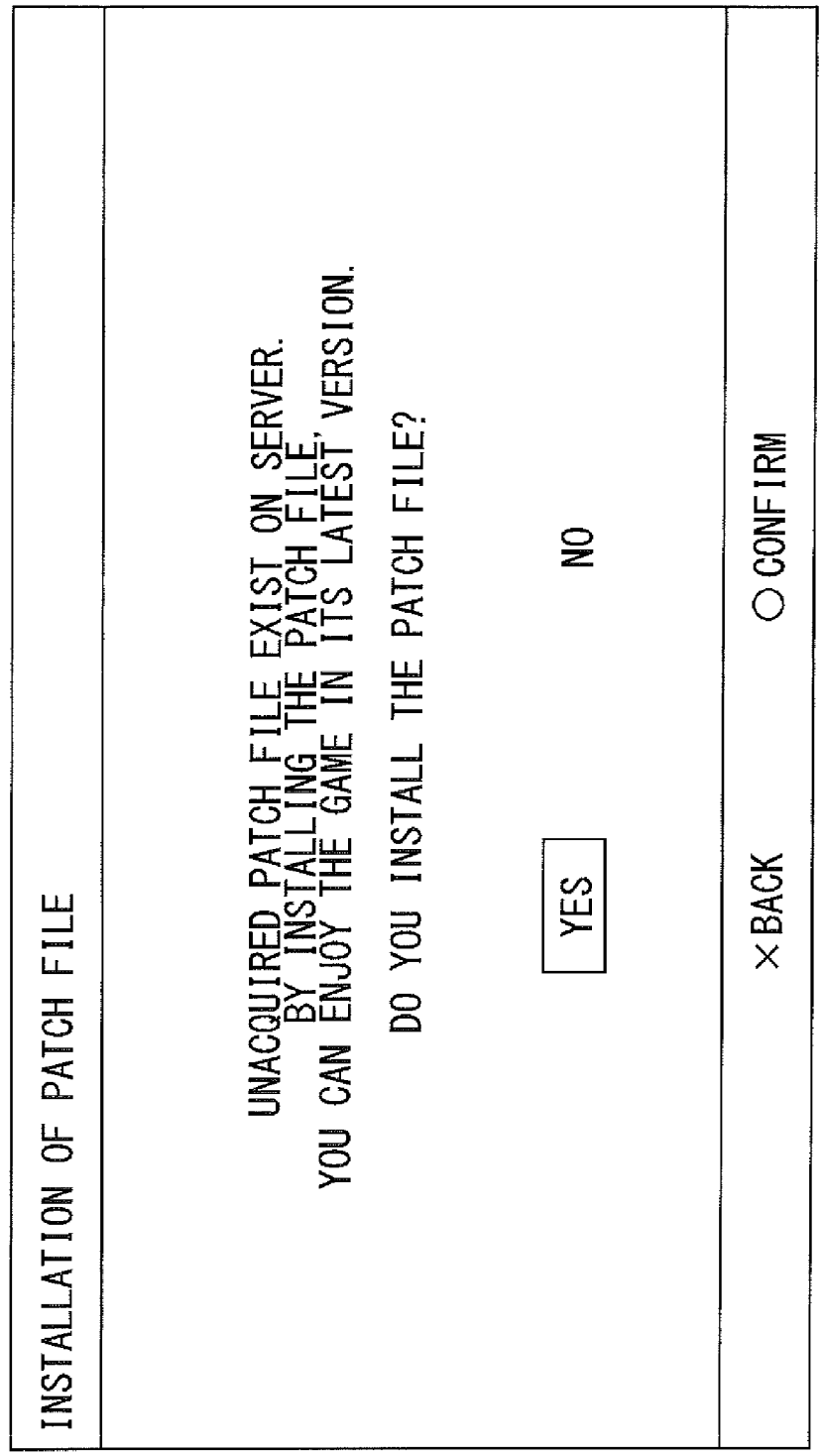
FIG. 9 shows the confirmation screen for confirming the installation of a patch file retained in a file providing server.

FIG. 9 shows the confirmation screen for confirming the installation of patch file retained in the file providing server 16. In this example, an un-acquired patch file exists in the file providing server 16, and this confirmation screen notifies a user that the game can be executed at its latest status by installing the patch file. If the user selects "Yes", the input receiving unit 104 receives the selection operation as a request for installing (Y in S28), and the patch file acquiring unit 136 uses address information associated with the new version information in the version file, acquires the patch file via the network 18 (S30), and installs the patch file (S20) on the hard disk drive 34. On the other hand, if the user selects "No" on this confirmation screen, the input receiving unit 104 receives the selection operation (N in S28), the game continues its start-up process, and the process for acquiring patch file according to the present flow chart ends. In this manner, the game device 10 according to the present exemplary embodiment continues the execution of the game application even if a patch file is not installed via the network 18 so as to guarantee fairness for game devices 10 that do not connect to the network 18.

A patch file is installed via the network 18, and then the application executing unit 114 terminates the game software and reboots the game software while applying the new patch file 160 (S22). After the game software is restarted, the version file acquiring unit 132 acquires a version file (S24), and the comparison unit 140 determines whether a patch file that has not been acquired exists (S26). In this case, a patch file that has not been acquired does not exist (N in S26), and then the process for acquiring a patch file ends and the application executing unit 114 continues to execute the game software.

Given above is an explanation based on the exemplary embodiments. These embodiments are intended to be illustrative only, and it will be obvious to those skilled in the art that various modifications to constituting elements and processes could be developed and that such modifications are also within the scope of the present invention. In the exemplary embodiments, a ROM medium is shown as an example of recording medium having recorded thereon game software. Alternatively, the recording medium may be a medium on which information is re-writable.

What is claimed is:

1. An information processing apparatus comprising:
a read-only memory (ROM) operative to store application software and a patch file separately and independently;
a drive device operative to read out data from the ROM;
a storage device;
a read controlling unit operative to control the drive device to read the application software from the ROM, wherein the read controlling unit, upon receiving a request for activating the application software, allows the drive device to read out the patch file from the ROM and install the read patch file on the storage device;
a processor operative to activate the application software while applying the installed patch file on the storage device to the activated application software;
a version file acquiring unit operative, after the activation of the application software, to acquire a version file via a network while using identification information of the activated application software, the version file associating version information of at least one patch file of the application software and address information, indicating a location where the at least one patch file is to be stored, with each other;
a comparison unit operative to compare version information of the patch file applied to the activated application software and the version information of the at least one patch file included in the version file; and
a patch file acquiring unit operative, in case the version file includes the version information of the at least one patch file is newer than the version information of the patch file applied on the application software, to acquire the at least one patch file via a network while utilizing the address information that is associated with the at least one patch file and to install the at least one patch file on the storage device.

2. The information processing apparatus according to claim 1, wherein the read controlling unit, upon receiving a request for installing the patch file from the ROM, installs the patch file from the ROM on the storage device, and the processor does not activate the application software unless the patch file from the ROM is installed on the storage device by the read controlling unit.

3. The information processing apparatus according to claim 1, wherein the read controlling unit, if a patch file of a same version as that of a patch file saved in the ROM has already been installed on the storage device, disables the drive device for reading out the patch file saved in the ROM.

4. The information processing apparatus according to claim 1, wherein the patch file acquiring unit, upon receiving a request for installing the patch file, installs the patch file on the storage device, and the processor, even if the patch file is not installed on the storage device by the patch file acquiring unit, continues the execution of the application software.

5. A non-transitory, computer readable storage medium containing a program to be executed by a computer, the program comprising:

a first program module operative to control a drive device of the computer to read a read-only memory (ROM), which stores application software and a patch file separately and independently, to control the drive device to read the application software from the ROM upon receiving a request for activating the application software, and to allow the drive device to read out the patch file from the ROM and install the read patch file on a storage device of the computer;

a second program module operative to cause a processor of the computer to activate the application software and to apply the installed patch file on the storage device to the activated application software;

a third program module operative to acquire, after the activation of the application software, a version file via a network while using identification information of the activated application software, the version file associating version information of at least one patch file of the application software and address information, indicating a location where the at least one patch file is to be stored, with each other;

a fourth program module operative to compare version information of the patch file applied to the activated application software and the version information of the at least one patch file included in the version file; and a fifth program module operative, in case the version file includes the version information of the at least one patch file is newer than the version information of the patch file applied on the application software, to acquire the at least one patch file via a network while utilizing the address information that is associated with the at least one patch file and to install the at least one patch file on the storage device.

6. A method, comprising:

storing application software and a patch file separately and independently in a read-only memory (ROM);

controlling a drive device to read the application software from the ROM, and upon receiving a request for activating the application software, allowing the drive device to read out the patch file from the ROM and install the read patch file on a storage device;

activating the application software using a processor and applying the installed patch file on the storage device to the activated application software;

after the activating the application software, acquiring a version file via a network using identification information of the activated application software, the version file associating version information of at least one patch file of the application software and address information, indicating a location where the at least one patch file is to be stored, with each other;

comparing version information of the patch file applied to the activated application software and the version information of the at least one patch file included in the version file; and acquiring, in case the version file includes the version information of the at least one patch file is newer than the version information of the patch file applied on the application software, the at least one patch file via a network while utilizing the address information that is associated with the at least one patch file and to install the at least one patch file on the storage device.

* * * * *